(12) United States Patent
Kristoffersen et al.

(10) Patent No.: US 8,615,730 B2
(45) Date of Patent: Dec. 24, 2013

(54) MODELED TYPES-ATTRIBUTES, ALIASES AND CONTEXT-AWARENESS

(75) Inventors: Esben Nyhuus Kristoffersen, Dyssegaard (DK); Heinrich Hoffmann Clausen, Gentofte (DK); Lars Hammer, Frederiksberg (DK); Thomas Hejlsberg, Horsholm (DK)

(73) Assignee: Microsoft Corporation, Redmond, WA (US)

( * ) Notice: Subject to any disclaimer, the term of this patent is extended or adjusted under 35 U.S.C. 154(b) by 1896 days.

(21) Appl. No.: 11/486,579

(22) Filed: Jul. 14, 2006

(65) Prior Publication Data

US 2008/0016492 A1 Jan. 17, 2008

(51) Int. Cl.
*G06F 9/45* (2006.01)

(52) U.S. Cl.
USPC .......................................................... 717/104

(58) Field of Classification Search
USPC .......................................................... 717/104
See application file for complete search history.

(56) References Cited

U.S. PATENT DOCUMENTS

| | | | | |
|---|---|---|---|---|
| 6,101,539 | A * | 8/2000 | Kennelly et al. | 709/223 |
| 6,223,185 | B1 * | 4/2001 | Berkland et al. | 1/1 |
| 6,434,554 | B1 | 8/2002 | Asami et al. | 707/4 |
| 6,697,794 | B1 | 2/2004 | Milby | 707/2 |
| 6,735,584 | B1 | 5/2004 | Chou | 707/3 |
| 6,738,968 | B1 | 5/2004 | Bosworth et al. | 717/157 |
| 6,748,388 | B1 * | 6/2004 | Kasamsetty et al. | 1/1 |
| 6,938,044 | B1 | 8/2005 | Milby | 707/100 |
| 6,976,029 | B2 | 12/2005 | Venkatesh et al. | 707/102 |
| 7,725,501 | B1 * | 5/2010 | Stillman et al. | 707/805 |
| 7,774,182 | B2 * | 8/2010 | Paterson | 703/6 |
| 2004/0083199 | A1 * | 4/2004 | Govindugari et al. | 707/1 |
| 2005/0060135 | A1 | 3/2005 | Gauckler et al. | 703/22 |
| 2005/0091231 | A1 | 4/2005 | Pal et al. | 707/100 |
| 2005/0177551 | A1 | 8/2005 | Rathakrishnan et al. | 707/2 |
| 2006/0143592 | A1 * | 6/2006 | Bender et al. | 717/104 |
| 2007/0027907 | A1 * | 2/2007 | Kulkarni et al. | 707/103 R |
| 2009/0132219 | A1 * | 5/2009 | Paterson | 703/11 |

FOREIGN PATENT DOCUMENTS

WO  WO 2005/081668 A2  9/2005

OTHER PUBLICATIONS

Harrison, C.J. et al., "Structure Editors: User-Defined Type Values and Type Inference", *IEEE*, 2000, 241-247, http://ieeexplore.ieee.org/search.

Seshadri, P., "Enhanced Abstract Data Types in Object-Relational Databases", *The VLDB Journal*, 1998, 7, 130-140, http://delivery.acm.org.

Stonebraker, M., "Inclusion of New Types in Relational Data Base Systems", http://www.cs.wisc.edu, 1-19, 1986.

* cited by examiner

*Primary Examiner* — John Chavis
(74) *Attorney, Agent, or Firm* — Woodcock Washburn, LLP

(57) ABSTRACT

Modeled Types allow a developer to define attributes and/or code when defining a new type. When the Modeled Type is used, specific values may be assigned to the attributes. The consumer of the values of the attributes can be the type itself by executing the logic during application execution, or the consumer may be the runtime framework or the application using the values by querying the meta-data of the Modeled Type. Modeled Type Aliasing defines a Modeled Type based on another Modeled Type allowing both a new unique name but at the same time optionally supplying specific values to one or more of the attributes of the base Modeled Type. Context-aware Modeled Types provide a description of how to determine the value for the attribute.

9 Claims, 3 Drawing Sheets

MODELED TYPES-ATTRIBUTES, ALIASES AND CONTEXT-AWARENESS

BACKGROUND

Data has become an important asset in almost every application, whether the application is a Line-of-Business application that browses products and generates orders or a Personal Information Management application that schedules meetings. Applications are increasingly becoming data centric—that is, applications plan a significant portion of their design- and run-time experience around querying, manipulating, and presenting data. Many of these applications deal with data that is rich in semantics. Many of today's applications expend significant effort (in procedural code) to preserve the data semantics. While relational models (and systems) have been very successful in data management, they have failed to capture the application data models. Most applications (and application frameworks) roll their own data model on top of relational systems to bridge the impedance mis-match between the data and the application programming environment.

Most applications, whether Line-of-Business, Personal Information Management, or Information Worker-based, require data model concepts like rich structure, relationships, behaviors, and extensibility. Applications also deal with different types of data: relational rows, objects, XML documents, and files. The ultimate goal of data models would be to model application data semantics in a purely declarative fashion, however, to date this has not been possible.

SUMMARY

A Modeled Type is the definition of a new type which by itself describes some semantics of its contained data. Attributes of a Modeled Type enable the author of a Modeled Type to describe information needed to write related logic (e.g., business logic) for validation, formatting and so on, thereby enabling the Modeled Type and its related logic to be written by a developer who knows the attributes required, but who may not know the values to which the attributes should be set. The exact values of the attributes may be set by another developer, for example, when the Modeled Type is used in an application. Attributes may be added by the developer of the Modeled Type. Aliasing enables a Modeled Type to be defined based on an existing Modeled Type. Values may optionally be supplied for one or more of the existing Modeled Type's attributes to generate the Aliased Modeled Type. Context-aware Modeled Types enable runtime context or data to be used by the application, by the Context-aware Modeled Type or by both the Context-aware Modeled Type and the application.

Modeled Types allow a developer to define attributes and/or code when defining a new type. Later when the Modeled Type is used, specific values may be assigned to the attributes. The consumer of the values of the attributes can be the Modeled Type itself by implementing logic, the runtime framework, or the application may use the values by querying the meta-data of the Modeled Type. Modeled Type Aliasing defines a Modeled Type based on another Modeled Type allowing both a new unique name to be given to the Aliased Modeled Type and optionally supplying specific values to one or more of the attributes in the Aliased Modeled Type.

A Context-aware Modeled Type is a Modeled Type where the value of one or more of the attributes is not a direct value but a description of how to retrieve the value from the context at runtime (during execution).

A Modeled Type can be inherited from an existing Modeled Type. Attributes and/or specialization of the logic (e.g., business logic) of the base Modeled Type can be added to create the new Modeled Type. The Modeled Type is not restricted to describing business semantics related to data types only but can be applied to basically all kinds of types, including a control type on a form and so on. The type of the attributes of the Modeled Type are not restricted to being a native type, but may be any type, including another Modeled Type.

DETAILED DESCRIPTION

Overview

Some Business Application Frameworks allow the developer to add business semantics to data types native to the framework. For example, an application developer may be able to create a new data type with a unique name based on a native data type supported by the framework. It is often desirable to extend the data type with further business semantics (e.g. to specify that a field CustomerNumber (of basic type "integer") is an integer that falls within a specific range). However, the ability to add this logic using today's frameworks/programming languages is limited and non-extensible. For example, using known frameworks and programming languages, a developer may be able to create a data type named CustomerNumber based on the native data type int (integer). Use of the int data type would prohibit assigning a non-integer CustomerNumber. For example, a CustomerNumber of "BaldMountain" or "123.456" would be prohibited. Suppose, however, that valid CustomerNumbers for Company X fall in the range of 200,000 to 900,000. The data type int would not prohibit assigning a CustomerNumber of 145,236, even though that is not a valid CustomerNumber for Company X. Thus, typically, in order for Company X to make sure that a particular CustomerNumber is valid, special validation processing would be required within each application that uses CustomerNumber.

It may be desirable to be able to define types by describing the additional information that must be applied when the type is used, (e.g. to say that a range must be applied when a type CustomerNumber is used but not specify the values of the range when the Modeled Type is created). This approach enables one developer to define a Modeled Type without specific domain knowledge of the usage of the Modeled Type. The value of this approach is this: the applications which use the Modeled Type would not have to include implicit code within them to e.g. validate the data or run other relevant business logic, (e.g., CustomerNumber would not have to be validated by code within each application using that piece of data) but instead can rely on the CustomerNumber Modeled Type to do its own validation, thus reducing programming effort and decreasing the likelihood of introducing program error.

Exemplary Computing Environment

Figure 1:
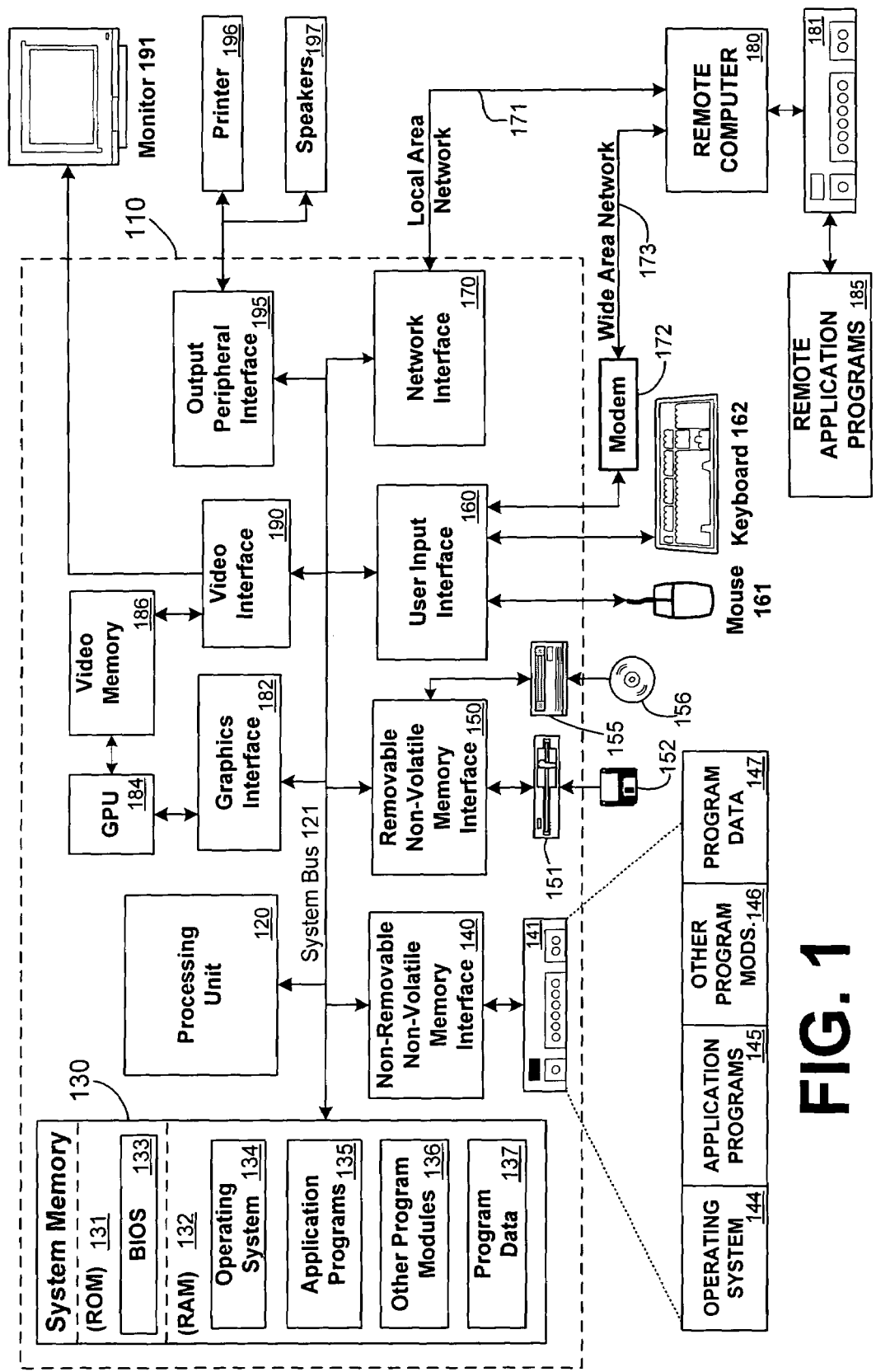
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Modeled Data Types

Modeled Types allow a developer or other user to define attributes and/or code when defining a new type. For example, a CustomerNumber Modeled Type can be defined with a minimum and maximum attribute (called, for example, Min and Max) to be used to define a valid range for customer numbers and code (business logic) associated with the Modeled Type can refer to Min and Max without knowing exact values for Min and Max at this time. When the Modeled Type is used (e.g,. when an application is written that uses the CustomerNumber Modeled Type), specific values may be assigned to the attributes. For example, when defining a CustomerRecord data type in an order-entry application, one of the fields of the customer record may be defined to be of Modeled Type CustomerNumber and the developer of the order-entry program may supply the values Min=1 and Max=999, meaning that a valid customer number for this application must be at least 1 and no more than 999. The same application may also define a VendorRecord including a VendorNumber field. The type of VenderNumber could also be the Modeled Type CustomerNumber but may have different values supplied for the Min and Max attributes, thereby reusing the entire logic implemented in the Modeled Type. The consumer of the values of the attributes can be the Modeled Type itself (e.g. for validation, formatting, etc.) by applying logic inside the Modeled Type or the consumer of the values of the attributes may be the runtime framework or the application, using the values by querying the Modeled Type's attribute values.

Modeled Type Aliasing defines a Modeled Type based on another Modeled Type by allowing a new unique name to be assigned to the new Modeled Type and by optionally supplying specific values to one or more of the attributes of the base Modeled Type. A Context-aware Modeled Type is a Modeled Type where the value of one or more of the attributes is not a direct value but instead is a description of how to retrieve the value from the context at runtime (during execution). For example, when modeling a PhoneNumber type to be used as a field on Customer records, it may be desirable to allow the country-code attribute of a Customer's PhoneNumber to default to and/or to be validated based on a CountryOfResidence field of the same Customer record instead of being carried directly by the PhoneNumber type. During execution of the application using the PhoneNumber Modeled Type, data for a specific Customer record data may be available and thus the PhoneNumber data for that Customer can be validated using the Customer's CountryOfResidence data, applying the logic associated with the PhoneNumber Modeled Type. It will be appreciated that the context-specific information available to a Context-aware Modeled Type is not restricted to a field in the record being processed but may be any information available at that time, as specified by the description of how to retrieve the value.

Any Modeled Type can be inherited from an existing Modeled Type. Additional attributes and/or specialization of the business logic written on the base Modeled Type is allowed. The Modeled Type is not restricted to describing business semantics related to data types only; this technique can be applied to any type (e.g. Modeled Type can be applied to Control types on a form). The type of the Attribute is not restricted to being a native type, but can be any type. For example, an Attribute type may be:

Native types like ints (integers), strings, floats or other types representing a static value Navigation path; representing a path to a property where, at runtime, the value can be read Model reference; allowing an attribute to point to other model element(s)

Any input that can be consumed by a query engine at runtime to enable a Context-aware Modeled Type to retrieve the relevant data at runtime (during execution).

Figure 2:
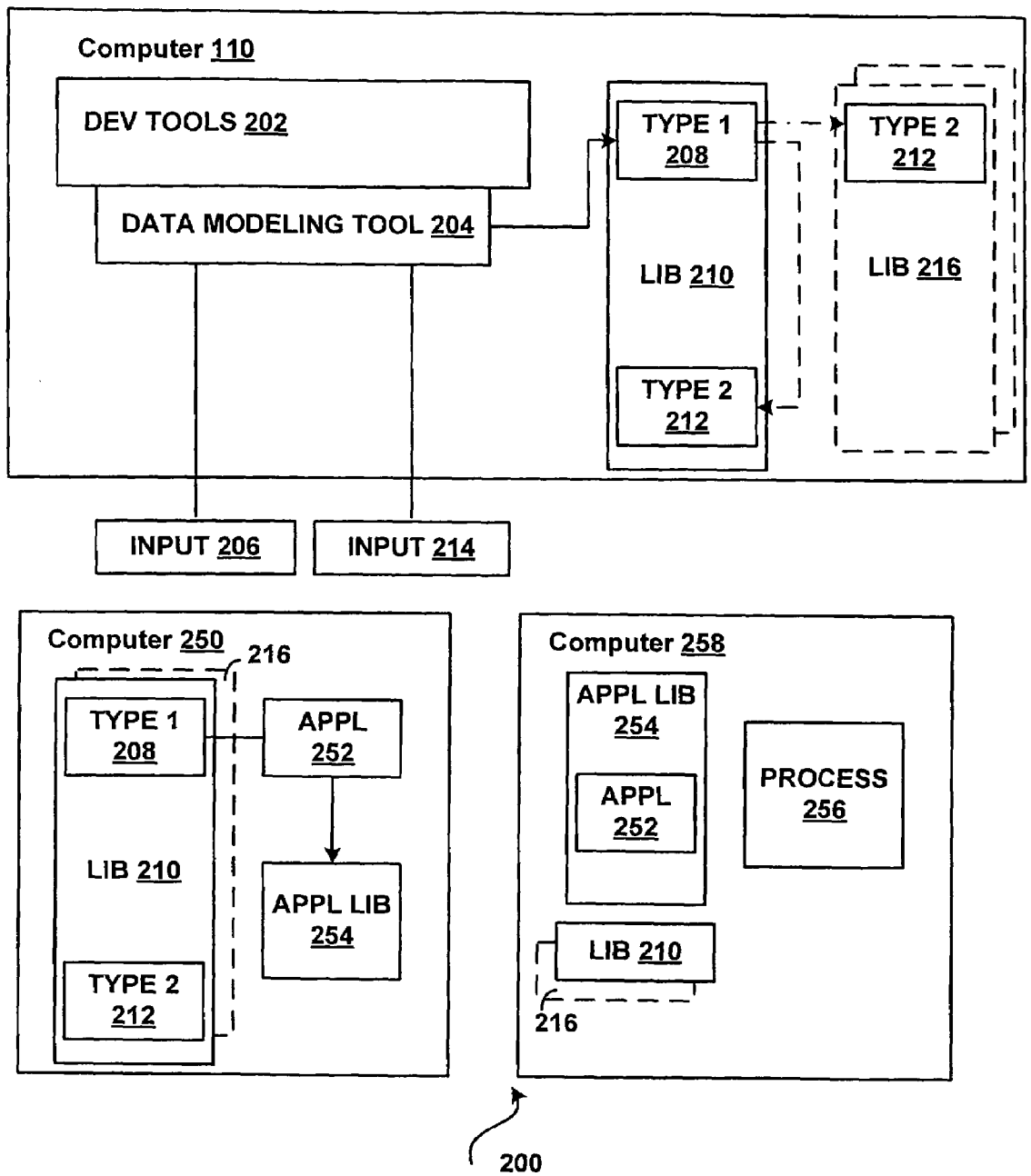
FIG. 2 is a block diagram of a system for developing and using modeled types in accordance with some embodiments of the invention.

FIG. 2 illustrates a system 200 for developing and using modeled data types in accordance with embodiments of the invention. System 200 may reside on one or more computers such as computer 110 described above with respect to FIG. 1. Portions of system 200 may be distributed onto one or more such computers. System 200 may include some or all of the following: a computer such as computer 110 on which resides a set of developer tools 202 such as an integrated design environment. A modeling tool 204 may be integrated within the developer tools 202 or may be an independent unit or plug-in which can be incorporated into the developer tools 202. One or more libraries (e.g., library 210, 216, etc.) may also reside on computer 110.

A user (e.g., a developer) may provide input 206 to the tool 204 to create a Modeled Type 208. The input to the modeling tool 204 may include one or more of the following:

a name and definition of the underlying data type for the new Modeled Type (this may be either a native data type or an existing Modeled Type), the name and type of one or more attributes of the Modeled Type. The attributes provided are typically required by the logic associated with the new Modeled Type, programming code which when executed applies logic to the data of the new Modeled Type. The logic of the provided programming code may refer to or require the attributes described for the Modeled Type.

Hence, the Modeled Type (e.g., Modeled Type 208) may be based on a native data type such as "int", "string", "float", etc. or may be based on an already existing Modeled Type. (In FIG. 2, for example, Modeled Type 2 212 may be of type Modeled Type 1 208.) To create a new Modeled Type, the name and type of all the attributes needed by the business logic which is to be included in the new Modeled Type is specified and provided to the tool. The Modeled Type business logic (e.g., for validation, formatting, etc.) is provided to the tool. The business logic provided may refer to or use the attributes of the Modeled Type.

The Modeled Type and its associated business logic may be stored in one or more libraries such as library 210, library 216, etc. Libraries may reside on the same or on different computers. Any number of Modeled Types may be created and stored in the libraries.

Modeled Data Types may include basic Modeled Data Types and Modeled Data Types that have been extended (Aliased Modeled Data Types and Context-aware Modeled Data Types). In some embodiments of the invention, an existing Modeled Data Type (such as Modeled Data Type 1 208) may be extended to create an Aliased Modeled Data Type (e.g., Modeled Data Type 2 212) by providing addition input (e.g., input 214 to the data modeling tool 204). The Aliased Modeled Data Type 212 may be created in the same library as the existing Modeled Data Type (e.g., in library 210) on which it is based or in a different library (e.g., in library 216). The libraries may be on the same computer (e.g., on computer 110) or on different computers (e.g., on computer 110 and computer 250). For example, the Aliased Modeled Data Type 212 in library 216 may be created by supplying a reference to an existing Modeled Data Type (e.g., to Modeled Data Type 1 208) including a reference to the library in which the existing Modeled Data Type resides (e.g., to library 210) or both the Modeled Data Type which is being extended and the Aliased Modeled Data Type being created may be created in the same library (e.g., Modeled Data Type 2 212 may be created in library 210). Values may be supplied for one or more attributes of the Modeled type being extended to create the new Aliased Modeled Data type. The new Aliased Modeled Data type may be saved in a library (e.g., in library 210, library 216, etc.).

One or more Modeled Types/Aliased Modeled Types/Context-aware Modeled Types may be created and saved in one or more libraries. The library or libraries may be distributed to one or more other computers such as computer 250 to aid in the development of applications, such as application 252. That is, Modeled Types may be provided in one or more libraries intended to facilitate applications programming conducted by developers in other business enterprises. Hence the developers who create the different Modeled Types may or may not be the same developers who use the Modeled Types during application design/development. Of course it will be appreciated that developers working on computer 110 may also write applications using Modeled Types stored in libraries.

However, in typical usage, one or more libraries 210, 216, etc. are copied to another computer (e.g., computer 250) and are used by other developers in the creation of applications such as application 252 using Modeled Types in those libraries. For example, to use a Modeled Type such as Modeled Type 208 in library 210 on computer 250, a reference to the library containing the Modeled Type 208 may be provided. When the application 252 is created, the fields, controls, etc. referenced in the application 252 may be created using a Modeled Type (e.g., Modeled Data Type 208) as the type of the field (instead of using a native data type such as int, for example). The Modeled Type used may be any type of Modeled Type. For example, an application may define a CustomerRecord, where CustomerRecord includes a field called CustNo. CustNo may be defined to be of Modeled Type CustomerNumber, where CustomerNumber is a Modeled Type as described in the above example. For each field, control, or other program element which uses a Modeled Type in the application, the exact values for all the attributes of that Modeled type (e.g., Min=1, Max=99 for CustomerNumber) may be provided, by the application developer (e.g., in the application meta-data). Alternatively the Modeled Type may specify some or all of the values for the attributes.

The application may then be compiled to create an executable, stored in an applications library 254, possibly tagged with the actual values of the attributes of the Modeled Types used in the application as described above, and may subsequently be deployed to an end user machine (e.g., computer 258) along with the library or libraries in which the Modeled Types are stored (library 210, 216, etc.).

In some embodiments of the invention, instead of supplying an exact value for an attribute, a way to compute or deduce the value within a given context may be provided instead. A Context-aware Modeled Type is a Modeled Type where the value of one or more of the attributes is not a direct value but instead is a description of how to retrieve the value from the context at runtime (during execution). For example, when modeling a PhoneNumber data type (for use, perhaps in a Customer record), it may be desirable to allow a country-code attribute of PhoneNumber to default to and/or to be validated based on a CountryOfResidence field of the particular Customer record instead of being carried directly by the PhoneNumber Modeled Type. Thus, the application developer may wish to add a country or country code field to a Customer record, reflecting the country in which the telephone number is in use. This information is required, for example, in order to validate that the telephone number is semantically legal. For instance, in the United States of America, valid phone numbers are in the format: (999) 999-9999, the first three numbers reflecting an area code, the second three an exchange and the last four the line number. In Denmark, however, a valid phone number follows the format: 99 99 99 99. Thus in order to determine if a telephone number 12345678 is an invalid number, one would need to know if the number is an American or Danish telephone number. During execution of the application, the CountryofResidence data for the CustomerRecord being processed may be used to determine if the field of type PhoneNumber is invalid. The Modeled Type logic (e.g., validation of phone number data) is not provided in the application but is provided by the Modeled Type.

The application may then be compiled to create an executable, stored in an applications library 254 and may subsequently be deployed to an end user machine (e.g., computer 258) along with the library or libraries in which the Modeled Types are stored (library 210, 216, etc.).

The application 252 deployed on computer 258 may be executed by creating a process 256 for application 252. (Alternatively, execution of the application may take place on the computer on which it was developed (computer 250) by initiating a process (not shown) for the application 252 on computer 250.) When the program element of type Modeled Type is accessed, the library containing the Modeled Type may be loaded and the business logic associated with the Modeled Type may be executed. The data being processed may be evaluated by the business logic (of which range processing is just one non-limiting example) associated with the appropriate Modeled Type. As described above, the attribute values may be provided in the application meta-data or may be specified in an Aliased Modeled Type. The attribute values may be supplied as exact values or as a way to retrieve the value within a particular context.

Suppose for example, that application 252 is an interactive order-entry application. Suppose a Create Customer function of the order-entry application is initiated (e.g., process 256) and a customer number (field CustNo) of Modeled Type CustomerNumber is entered. In some embodiments of the invention, the library containing the Modeled Type CustomerNumber is loaded when the field of type Modeled Type is encountered. (Alternatively, the library may be loaded earlier such as when the application starts.) When CustNo is encountered, the logic associated with CustomerNumber in the Modeled Type library can be executed on the data in the CustNo field. If, for example, the CustomerNumber Min and Max values were defined in the Modeled Type as 1 and 999, the data in the CustNo field would be evaluated by the Modeled Type code for type CustomerNumber. If the CustNo data is valid, (an integer number between 1 and 999), the application would proceed. If the Modeled Type code determines that the CustNo data does not fall within the range of 1 and 999, the CustNo data may be flagged as an error and rejected. It will be appreciated that the application itself therefore would not require this validation code.

Alternatively, (to continue the example), the values for Min and Max may be provided in the application meta-data. Suppose the application meta-data indicates that the Min value is 1 and the Max value is 999. The logic associated with the CustomerNumber Modeled Type would be run, substituting 1 for Min and 999 for Max. If the CustNo data is valid, (an integer number between 1 and 999), the application would proceed. If the Modeled Type code determines that the CustNo data does not fall within the range of 1 and 999, the CustNo data may be flagged as an error and rejected. It will be appreciated that the application itself therefore would not require this validation code but would require assigning values to Min and Max in some way (e.g., within the application meta-data).

Alternatively, instead of providing exact values for attributes, the application meta-data may instead provide a way to compute or deduce the attribute values. For example, suppose a PhoneNo of type Modeled Type PhoneNumber for CustNo is encountered in the execution of the order-entry application. Suppose the data for PhoneNo for this particular customer record is "12345678". To determine whether this data is an invalid phone number, the data in the field CountryofResidence (suppose the CountryofResidence data is "Denmark") may be examined and the business logic associated with the Modeled Type PhoneNumber executed using "12345678" and "Denmark" to determine if the phone number is invalid. That is, the Context-aware Modeled Type can "see" the fields within the actual customer record (or other information as indicated by the meta-data) and thus can use the contents of the CountryofResidence field (or other data) in its business logic processing.

Figure 3:
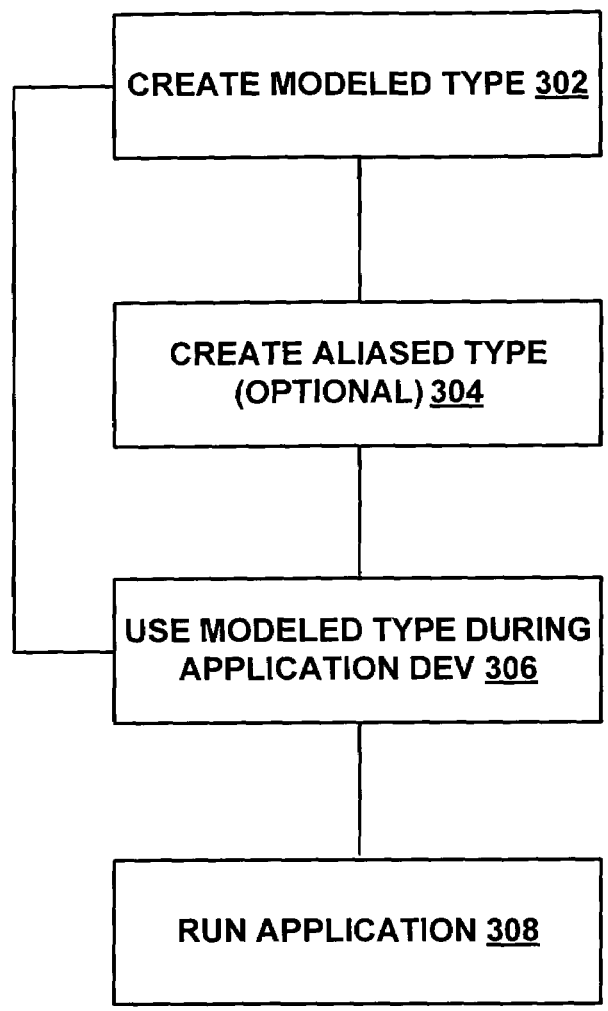
FIG. 3 is a flow diagram of a method for developing and using modeled types in accordance with some embodiments of the invention.

FIG. 3 illustrates a flow diagram for developing and using Modeled Types in accordance with embodiments of the invention. At 302 a modeled type is created as described above. The underlying data type (native or existing Modeled Type) is specified, the name and type of the attributes needed by the logic associated with the Modeled Type is specified, the logic for the Modeled Type is provided (e.g., business logic such as validation, formatting, etc.) and the Modeled Type is saved in one or more libraries. This series of actions may be repeated for one or more additional Modeled Types.

Optionally, at 304 an Aliased Modeled Type may be created from an existing Modeled Type. A reference may be defined to identify the Modeled Type and the library in which the identified Modeled Type resides. Values may be provided for one or more attributes of the Modeled Type. The extended Modeled Type may be saved in one or more libraries. This series of actions may be repeated for one or more additional Aliased Modeled Types.

At 306, a Modeled Type defined in 302 or 304 above may be used during development of an application. To use a Modeled Type, a reference to the Modeled Type and the library in which the Modeled Type (whether base or extended) resides is provided. While the application is being created, one or more of the fields, controls, or other program elements used in the application may be defined to be of type <Modeled Type>. For example, an application may be written defining a CustomerRecord with a field called CustNo of type CustomerNumber where CustomerNumber is a Modeled Type. For each field, control or other program element which uses a Modeled Type, the values for the attributes of that Modeled Type are supplied. (For example the value for Min (e.g., 1) may be supplied and the value for Max (e.g., 999) may be supplied, if the Modeled Type used does not already define values for Min and Max. The value may be supplied as an exact value (e.g., 1, 999) or as a description of how to retrieve the value within a given context (as in the PhoneNumber/ CountryofResidence example described above). The logic associated with the Modeled Type is not provided by the application code but is supplied by the Modeled Type. The application may then be compiled and stored as an executable or in a program library. The application and the Modeled Type libraries required by the application may be copied or deployed to other computers (e.g., to an end user's computer).

At 308 the application using the Modeled Type may be executed by starting the application. The library/libraries in which the Modeled Types used by the application are stored may be loaded when the Modeled Type is encountered during processing (e.g., when a field of type <Modeled Type> is encountered) or earlier in the execution of the application. The logic associated with the Modeled Type may be executed upon the data being processed in the application, using the attributes value defined in the application meta-data or in the Modeled Type itself. If the Modeled Type is a Context-aware Modeled Type, other information such as but not limited to other fields in the record being processed may be available to be acted upon by the Modeled Type logic. For example, if a Customer record with "12345678" in the PhoneNo field (of Modeled Type PhoneNumber) has "Denmark" in the CountryOfResidence field for that customer, the Context-aware Modeled Type logic may determine if "12345678" is an invalid Danish phone number.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer-readable storage medium that is not a signal and that comprises computer-executable instructions that when executed by one or more processors of a computing environment cause the computing environment to:

receive input specifying a name for a first modeled type, an underlying type for the first modeled type, at least one attribute of the first modeled type, and programming logic to be executed on a program element of the first modeled type during execution of an application to validate the program element against a range of valid values of the program element;

save, in a first library, the first modeled type and the programming logic to be executed on the program element of the first modeled type during execution of the application;

receive input specifying a second modeled type based on the first modeled type and a name for the second modeled type and providing a description of how to determine an explicit value for the at least one attribute during execution of the application; and save, in a second library, the second modeled type including the description of how to determine the explicit value for the at least one attribute during execution of the application, the second library being different from the first library in which the first modeled type is saved.

2. The computer-readable storage medium of claim 1, comprising further computer-executable instructions that when executed by one or more processors of the computing environment cause the computing environment to:

receive input regarding the second library during execution of the application, wherein the second library is loaded in response to the received input regarding the second library.

3. The computer-readable storage medium of claim 1, comprising further computer-executable instructions that when executed by one or more processors of the computing environment cause the computing environment to:

receive input specifying that the second modeled type is generated based on the first modeled type by adding an additional attribute to the first modeled type and modifying the programming logic of the first modeled type.

4. A computer-implemented method for using modeled types, the method comprising:

receiving, by one or more processors, input specifying a name for a first modeled type, an underlying type for the first modeled type, at least one attribute of the first modeled type, and programming logic to be executed on a program element of the first modeled type during execution of an application to validate the program element against a range of valid values of the program element;

saving, by the one or more processors, in a first library, the first modeled type and the programming logic to be executed on the program element of the first modeled type during execution of the application;

receiving, by the one or more processors, input specifying second modeled type based on the first modeled type and a name for the second modeled type and providing a description of how to determine an explicit value for the at least one attribute during execution of the application; and saving, by the one or more processors, in a second library, the second modeled type including the description of how to determine the explicit value for the at least one attribute during execution of the application, the second library being different from the first library in which the first modeled type is saved.

5. The computer-implemented method of claim 4, further comprising:
receiving input regarding the second library during execution of the application, wherein the second library is loaded in response to the received input regarding the second library.

6. The computer-implemented method of claim 4, further comprising:
receiving input specifying that the second modeled type is generated based on the first modeled type by adding an additional attribute to the first modeled type and modifying the programming logic of the first modeled type.

7. A computing system for using modeled types, the system comprising:
one or more processors;
memory having stored therein computer-executable instructions that when executed by the one or more processors cause the computing system to:
receive input specifying a name for a first modeled type, an underlying type for the first modeled type, at least one attribute of the first modeled type, and programming logic to be executed on a program element of the first modeled type during execution of an application to validate the program element against a range of valid values of the program element;
save, in a first library, the first modeled type and the programming logic to be executed on the program element of the first modeled type during execution of the application;
receive input specifying second modeled type based on the first modeled type and a name for the second modeled type and providing a description of how to determine an explicit value for the at least one attribute during execution of the application; and
save, in a second library, the second modeled type including the description of how to determine the explicit value for the at least one attribute during execution of the application, the second library being different from the first library in which the first modeled type is saved.

8. The computing system of claim 7, wherein the memory further comprises computer-executable instructions that when executed by the one or more processors cause the computing system to:
receive input regarding the second library during execution of the application, wherein the second library is loaded in response to the received input regarding the second library.

9. The computing system of claim 7, wherein the memory further comprises computer-executable instructions that when executed by the one or more processors cause the computing system to:
receive input specifying that the second modeled type is generated based on the first modeled type by adding an additional attribute to the first modeled type and modifying the programming logic of the first modeled type.

* * * * *